US010181913B2

(12) United States Patent
Taher et al.

(10) Patent No.: US 10,181,913 B2
(45) Date of Patent: Jan. 15, 2019

(54) FREQUENCY RESPONSE CALIBRATION OF SYNCHRONIZED MIMO MEASUREMENT RECEIVERS WITH LOCAL AND REMOTE TRANSMITTERS

(71) Applicant: NATIONAL INSTRUMENTS CORPORATION, Austin, TX (US)

(72) Inventors: Tanim Mohammed Abu Taher, Austin, TX (US); Ahsan Aziz, Austin, TX (US); James W. McCoy, Austin, TX (US)

(73) Assignee: NATIONAL INSTRUMENTS CORPORATION, Austin, TX (US)

( * ) Notice: Subject to any disclaimer, the term of this patent is extended or adjusted under 35 U.S.C. 154(b) by 0 days.

(21) Appl. No.: 15/821,473

(22) Filed: Nov. 22, 2017

(65) Prior Publication Data
US 2018/0159637 A1 Jun. 7, 2018

Related U.S. Application Data

(60) Provisional application No. 62/438,285, filed on Dec. 22, 2016, provisional application No. 62/429,631, filed on Dec. 2, 2016.

(51) Int. Cl.
*H04B 17/12* (2015.01)
*H04L 25/03* (2006.01)
(Continued)

(52) U.S. Cl.
CPC .......... *H04B 17/12* (2015.01); *H04B 7/0413* (2013.01); *H04B 17/14* (2015.01); *H04B 17/21* (2015.01);
(Continued)

(58) Field of Classification Search
CPC ........ H04B 17/14; H04B 17/11; H04B 17/21; H04B 17/15; H04B 7/0413; H04L 25/0202; H04L 25/03891; H01Q 3/267
See application file for complete search history.

(56) References Cited

U.S. PATENT DOCUMENTS 7,061,254 B1 6/2006 Shoulders et al.
2006/0058022 A1 3/2006 Webster
(Continued)

FOREIGN PATENT DOCUMENTS

CN 101682432 B 5/2007

*Primary Examiner* — Aristocratis Fotakis
(74) *Attorney, Agent, or Firm* — Meyertons Hood Kivlin Kowert & Goetzel, P.C.; Jeffrey C. Hood; Luke S. Langsjoen

(57) ABSTRACT

Techniques are disclosed related to calibrating and operating a multiple input multiple output (MIMO) radio system. In some embodiments, a dual mode calibration may be employed to calibrate a remote transmitter (RT). During a first, Sparse Full System Calibration (SFSC) mode, the RT may be physically connected to the MIMO radio system. In some embodiments, first and second equalizers may be derived for each of the RT and a local transmitter (LT), respectively. During a subsequent, Real-time Calibration (RTC) mode, the RT may be located remotely from the MIMO radio system, and the RT may be configured to communicate with the MIMO radio system over the air via an antenna. In the RTC mode, third equalizers may be derived for the LT. The RT may then be calibrated based on an equalizer that is derived from each of the first, second, and third equalizers. As one non-limiting example, the techniques described herein may enable real-time calibration for the RT even while the RT is located remotely from the MIMO radio system. In different embodiments, the calibration may be achieved by deriving either fractionally (Continued)

spaced frequency domain equalizers, or time domain equalizers.

20 Claims, 11 Drawing Sheets

(51) Int. Cl.
*H04B 7/0413* (2017.01)
*H04B 17/21* (2015.01)
*H04L 25/02* (2006.01)
*H04B 17/14* (2015.01)

(52) U.S. Cl.
CPC .... *H04L 25/0202* (2013.01); *H04L 25/03012* (2013.01); *H04L 25/03159* (2013.01); *H04L 25/03891* (2013.01)

(56) References Cited

U.S. PATENT DOCUMENTS

| | | | | |
|---|---|---|---|---|
| 2012/0300864 | A1* | 11/2012 | Merlin | H04B 7/0617 375/260 |
| 2014/0242914 | A1* | 8/2014 | Monroe | H04B 17/11 455/63.4 |
| 2015/0288467 | A1* | 10/2015 | Kahrizi | H04B 17/21 370/241 |
| 2016/0254870 | A1* | 9/2016 | O'Keeffe | H01Q 21/24 455/67.14 |
| 2017/0085005 | A1* | 3/2017 | Aue | H04B 1/40 |
| 2018/0040964 | A1* | 2/2018 | Benjebbour | H01Q 3/26 |

* cited by examiner

FREQUENCY RESPONSE CALIBRATION OF SYNCHRONIZED MIMO MEASUREMENT RECEIVERS WITH LOCAL AND REMOTE TRANSMITTERS

PRIORITY CLAIM

This application claims priority to U.S. provisional patent application Ser. No. 62/429,631, entitled "Combined Calibration Method to Time and Phase Synchronize MIMO Receive Channels and Perform Frequency Response Correction", filed Dec. 2, 2016, and U.S. provisional patent application Ser. No. 62/438,285, entitled "Frequency Response Calibration of Synchronized MIMO Measurement Receivers with Local and Remote Transmitters", filed Dec. 22, 2016, which are hereby incorporated by reference in their entirety as though fully and completely set forth herein.

TECHNICAL FIELD

The present disclosure is related to wireless communications and more particularly to calibrating multiple input multiple output (MIMO) radio systems.

DESCRIPTION OF THE RELATED ART

Wireless radio communications may be significantly affected by the communications environment. In Multiple Input Multiple Output (MIMO) radio systems, there may be undesirable phase misalignment and/or a lack of time synchronicity between the channels. In such cases, it may be desirable to phase align the channels and time synchronize the multiple channels to within a nanosecond or better. It may be further desirable to perform a frequency response correction of the imperfect hardware transmitters and receivers (this is independent of channel frequency response). Each of these processes involve computational complexity, cost, and latency. In some cases, a transmitter may be located remotely from the MIMO radio system, further complicating calibration efforts for communication between the MIMO radio system and the transmitter. As such, improvements in the execution of these processes may be desirable.

SUMMARY

Embodiments described herein relate to systems, storage media, and methods for calibrating a multiple input multiple output (MIMO) radio system using a reference sequence.

Some embodiments relate to a MIMO radio system comprising multiple receivers. Some embodiments relate to a method whereby a single calibration signal is used by a MIMO radio system to perform each of time synchronization, phase synchronization, and frequency response correction for each of the multiple receivers.

In some embodiments, a wide-band complex pilot signal is routed to the multiple N receivers using a 1:N splitter and N SP2T (1X2) switches. The receivers may digitize the received pilot signal, and then N equalizers may be derived, 1 for each of the N channels. In some embodiments, the derived equalizers may phase and time align the N channels, and may also correct for the non-flat frequency response caused by the imperfect transmitter-to-receiver hardware chain for each receive channel. The equalizer may be a fractionally spaced frequency domain equalizer or a time domain equalizer, according to various embodiments. This system may work in any digital radio MIMO receiver without substantial modification or addition of hardware components within the radios themselves, although external RF components like a splitter and switches may be required.

In some embodiments, the reference sequence may be a Zadoff-Chu (ZC) sequence, or another type of Constant Amplitude Zero Autocorrelation (CAZAC) sequence.

In some embodiments, the system may be configured to switch from a calibration mode into an operation mode once the calibration is completed. Switching to operation mode may comprise, by each receiver, receiving signals from a respective antenna. In some embodiments, the system may be configured to periodically reenter calibration mode wherein calibration may be repeated at preset intervals of time.

In some embodiments, a dual mode calibration may be employed to calibrate a remote transmitter (RT). During a first, Sparse Full System Calibration (SFSC) mode, the RT may be physically connected to the MIMO radio system. In some embodiments, first and second equalizers may be derived for each of the RT and a local transmitter (LT), respectively. During a subsequent, Real-time Calibration (RTC) mode, the RT may be located remotely from the MIMO radio system, and the RT may be configured to communicate with the MIMO radio system over the air via an antenna. In the RTC mode, third equalizers may be derived for the LT. The RT may then be calibrated based on an equalizer that is derived from each of the first, second, and third equalizers. For example, in this embodiment, real-time calibration may be achieved for the RT even while the RT is located remotely from the MIMO radio system.

Note that the techniques described herein may be implemented in and/or used with a number of different types of devices, including but not limited to base stations, access points, cellular phones, portable media players, tablet computers, wearable devices, and various other computing devices.

This Summary is intended to provide a brief overview of some of the subject matter described in this document. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

Figure 1:
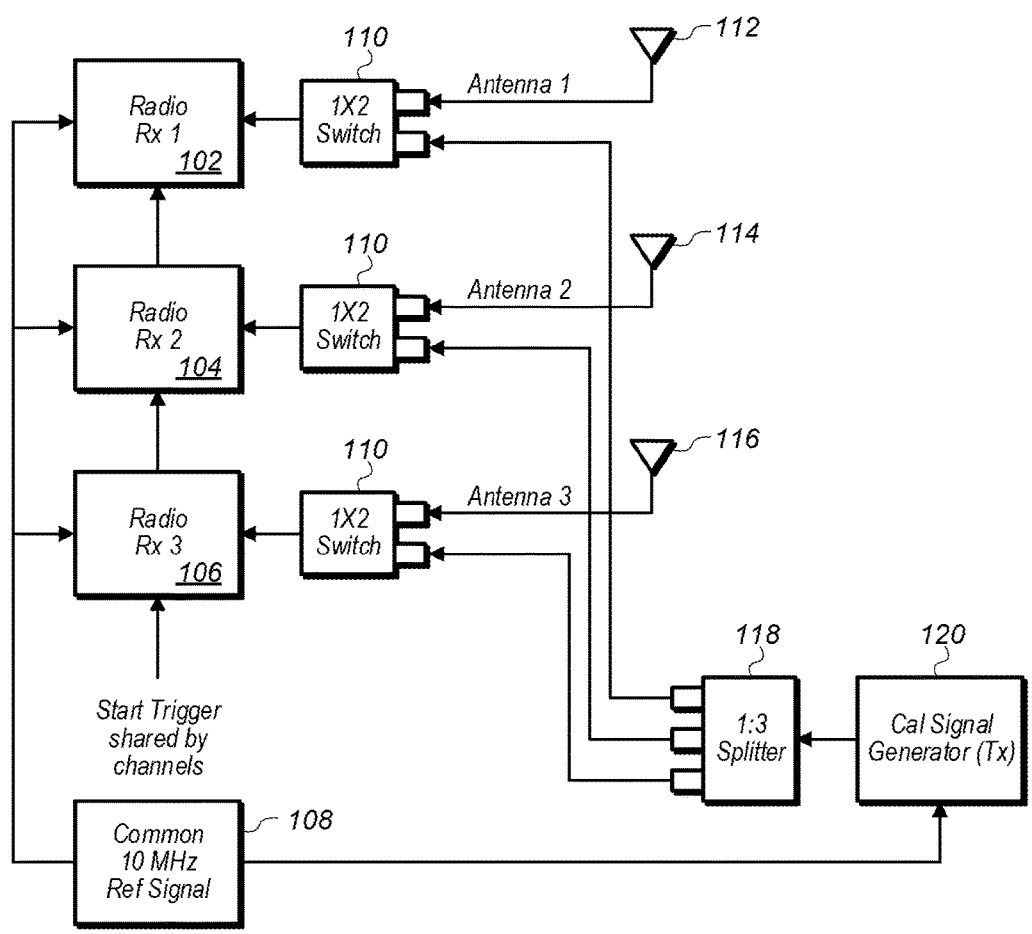
FIG. 1 illustrates an exemplary MIMO radio system setup configured to implement the methods described herein, according to some embodiments.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

The use of a multiple-input multiple-output (MIMO) radio device or a MIMO communication system for transmitting and receiving data may be improved if each of the multiple receivers and/or transmitters of the MIMO device are properly calibrated. Embodiments herein describe methods and devices for calibrating a MIMO device, which may be employed in any of a variety of technological fields and devices. For example, the MIMO device may be a mobile or portable computer system device which performs wireless communications, often referred to as a user equipment device (UE). Examples of UE devices include mobile telephones or smart phones (e.g., iPhone™, Android™-based phones), portable gaming devices (e.g., Nintendo DS™, Play Station Portable™, Gameboy Advance™), laptops, wearable devices (e.g., smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication. A MIMO UE may be a device that has multiple radio receivers and transmitters as part of its radio hardware.

Alternatively, in some embodiments, the MIMO radio device may be a measurement apparatus designed to perform channel sounding or other wireless measurements using cellular or another wireless technology. For example, the MIMO radio device may be a cellular measurement device for measuring radio channel conditions for cellular MIMO communications (e.g., 5G or NR communications). Other applications of calibration of MIMO radio devices are also possible, as may be appreciated by one of skill in the art.

FIG. 1—Configuration for Three Receiver System

FIG. 1 shows the RF connections and switches in a possible configuration of a multiple-input multiple-output (MIMO) radio device 100, according to some embodiments. The diagram shows 3 radios 102-106, but the methods and systems described herein can more generally support N MIMO channels for any N>1. In some embodiments, the radio receivers have 2 modes:

Calibration (Cal) Mode: In this mode, the SP2T switches 110 may disconnect radios 102-106 from the antennas 112-116 to prevent any over the air signal being received. Also, the 1X2 switch 110 may be connected to the Cal path. In these embodiments, the wideband complex cal pilot signal goes through the 1:N splitter 118, through the SP2T switches 110 and into the radios 102-106.

Operation Mode: In this mode, the receivers 102-106 are disconnected from the Cal path and connected to the antenna path for normal operation by switching the SP2T switches 110 to the antenna path 112-116.

Figure 2:
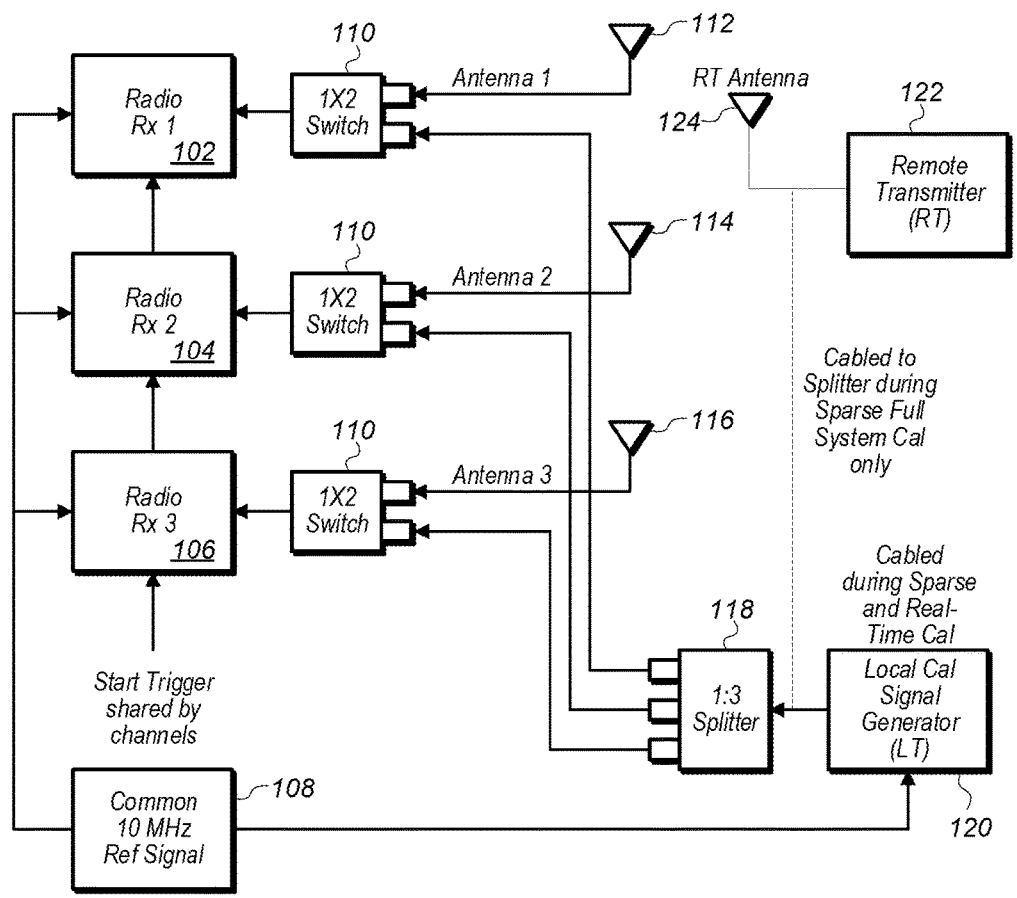
FIG. 2 illustrates an exemplary MIMO radio system setup including remote and local transmitters configured to implement the methods described herein, according to some embodiments.

FIG. 2—Configuration for Three Receiver System

FIG. 2 shows the RF connections and switches of a MIMO radio device 100 in a possible configuration similar to FIG. 1, but with the additional inclusion of a remote transmitter 122 (RT) (distinct from the MIMO radio device 100), and with the additional support for 2 distinct calibration modes, as described in further detail below. For example, FIG. 2 illustrates a communication system wherein it is desired for the MIMO radio device 100 to be in communication with a remote transmitter, and so embodiments herein describe methods for calibrating the RT to the multiple receivers of the MIMO radio device. As one example, the RT may be a pseudo base station that broadcast signals to perform channel sounding, by enabling the MIMO radio device to determine channel conditions at various locations of the pseudo base station. In these embodiments, the radio receivers may have 3 modes:

Sparse Full System Calibration (SFSC) Mode: In this mode, the SP2T switches 110 may be disconnected from the antennas 112-116 to prevent any over the air signal being received. Also, the 1X2 switch 110 may be connected to the Cal path. In these embodiments, the wideband complex calibration pilot signal goes from the Local Cal Signal Generator 120 (LT) through the 1:N splitter 118 (e.g., a 1:3 splitter in FIG. 1, although other values of N are possible), through the SP2T switches 110 and into the radios 102-106. Additionally, in SFSC mode, the remote transmitter 122 (RT) may be cabled (dotted line) to the 1:N splitter 118 in place of the local transmitter 120 (LT), whereby the RT 122 is configured to transmit a wideband complex calibration pilot signal through the 1:N splitter 118, through the SP2T switches 110, and into the radios 102-106.

Real-time Calibration (RTC) Mode: This mode is configured the same as SFSC, except that the RT 122 is not connected to the 1:N splitter 118 in RTC mode. For example, the RT may be located remotely from the receiver system during RTC mode, so that a cable connection is not possible. In other words, the RT 122 may be configured to be connected to the MIMO radio device 100 with a wired connection to operate in SFSC Mode, and may additionally configured to communicate wirelessly with the MIMO radio device 100 in RTC Mode while the RT is located remotely from the MIMO radio device.

Operation Mode: In this mode, the receivers 102-106 are disconnected from the Cal path and connected to the antenna path for normal operation by switching the SP2T switches 110 to the antenna path 112-116. Additionally, the RT is connected to the RT antenna 124 in operation mode, whereby the RT may transmit signals over the air to be received by the antennas 112-116. The RT may be located remotely from the MIMO radio device 100 while in operation mode.

In some embodiments, a common 10 MHz reference source 108 may be used for the various radios. The 10 MHz common reference signal 108 ensures that the digital-to-analog converter (DAC) of the signal generator 120 and the receivers' digitizer analog-to-digital converters (ADCs) 102-106 are locked with respect to the reference and to each other. With the 10 MHz clocks locked, the time alignment in the digitized ADC samples will hold for a long duration after applying the timing alignment calibration method described herein.

Sharing the 10 MHz references also means that the frequencies of the receivers 102-106 are very close and locked to each other. A further enhancement to this method may involve daisy chaining the Local Oscillators (LOs) that do the down conversion to ensure that the phase alignments also hold for a long duration after the disclosed method for calibration is complete. This may be accomplished for embodiments wherein the radios are configured to share LOs. In these embodiments, sharing a single LO between radio receivers may enable the MIMO communication system to remain calibrated for an extended duration of time relative to embodiments wherein the radio receivers do not share LOs. In embodiments where the radios are not configured to share LOs, the calibration method may be repeated more frequently to realign the phases. The remote transmitter (RT) and the MIMO radio device 100 may use GPS synchronized 10 MHz reference signals when sharing the exact same 10 MHz signal is not possible due to the further distance of the RT.

The local cal signal generator 120 and the remote transmitter 122 may each generate a complex pilot signal that is wideband, has desirable autocorrelation properties, and has a spectrum that is mostly flat throughout its bandwidth. The complex pilot signal may serve as the calibration signal for the calibration process. An example of such a sequence is a modified Zadoff Chu sequence, though other types of sequences are also possible. Zadoff-Chu (ZC) sequences are complex-valued mathematical sequences, which, when applied to radio signals, result in a signal with constant amplitude. Further, cyclically shifted versions of a ZC sequence imposed on a signal result in zero correlation with each other at the receiver because cyclically shifted versions of a ZC sequence are orthogonal. ZC sequences are a special type of Constant Amplitude Zero Autocorrelation (CAZAC) sequence. CAZAC sequences are complex-valued periodic sequences with cyclically shifted autocorrelation equal to zero and constant amplitude. Although ZC sequences are discussed herein to facilitate illustration, any of various appropriate CAZAC sequences or other wideband complex sequences may be used in other embodiments instead of or in addition to ZC sequences.

The Cal signal may arrive at each receiver at slightly different times, which may be nanoseconds apart as the cable lengths in each receiver path may be different. Also, the signal at each receiver may have a different frequency distortion as the frequency response of each receive hardware may be different. Additionally, there may be a phase offset between the complex samples received in each receiver. If the LOs are daisy chained, then this phase offset may be a constant but unknown value.

In some embodiments, each receiver 102-106 cross-correlates the received ZC sequence with a local, known copy of the ZC sequence. Because of the autocorrelation properties of the ZC sequence, a sharp peak will be observed in the correlation of the received ZC sequence with the local copy of the ZC sequence only when the two sequences are properly lined up (e.g., properly lined up in time and/or phase). The received ZC sequence may have experienced time and phase offsets during transmission, and the offset between the two sequences that is required to observe a peak in the cross-correlation may be used to deduce the time and/or phase offsets introduced by the communication channel. Furthermore, because the transmitted ZC sequence is mostly flat throughout its bandwidth, inhomogeneity in the amplitude frequency spectrum of the received sequence may be determined to be caused by an inhomogeneity in the frequency response of the imperfect hardware of the transmit-to-receive chain of that channel. As such, and as explained in further detail below, performing a channel estimation first using local copies of the ZC sequence may enable the receiver to derive an equalizer that determines the time offset, phase offset, and frequency response of the channel associated with the receiver.

During the calibration modes (e.g., any of the Cal, SFSC and/or RTC modes), the receivers ADCs may be triggered to start acquiring together, and the receivers may digitize the Cal signal. Although triggering is used, there may be several nanoseconds of deterministic but unknown delay between one ADC and another.

Figure 3:
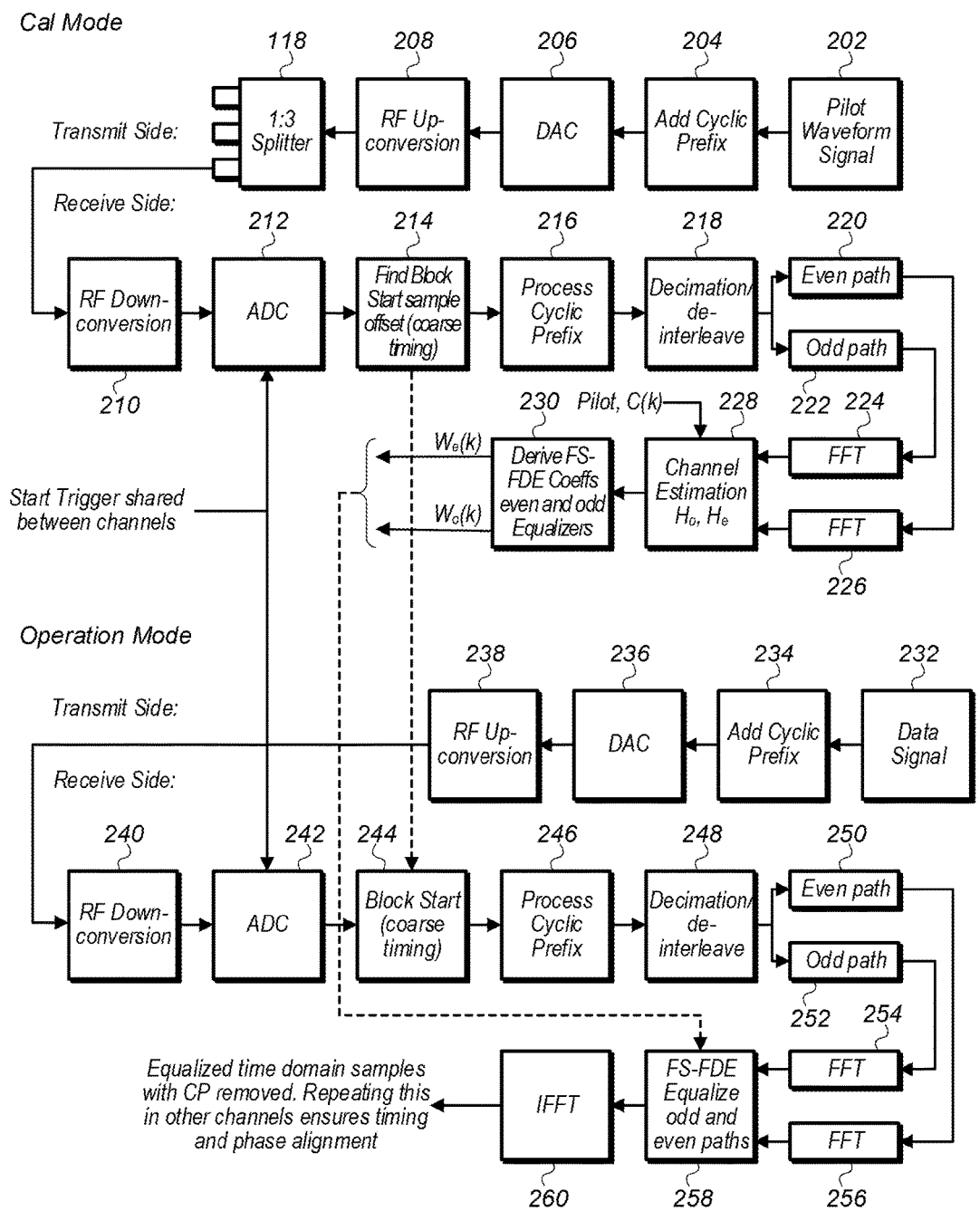
FIG. 3 is a flow diagram illustrating an exemplary method for performing calibration and subsequently operating using a fractionally spaced frequency domain (FS-FDE) equalizer.

FIG. 3—Fractionally Spaced Frequency Domain Equalizer

FIG. 3 is a flow diagram of an exemplary method for using a fractionally spaced frequency domain equalizer to calibrate and operate a MIMO radio system. FIG. 3 is illustrated for a single channel, but the steps illustrated in FIG. 3 may be repeated for each channel in the MIMO radio system.

At 202 a pilot waveform signal may be generated at the Cal signal generator 120. The pilot waveform signal may be a ZC sequence, another CAZAC sequence, or some other reference sequence, according to various embodiments.

At 204, a cyclic prefix is added to the pilot waveform signal. The cyclic prefix at the beginning of each block prevents inter-symbol interference (ISI) between one block to the next and allows periodicity necessary for the discrete Fourier transform equalization operations. The FS-FDE may then operate on blocks of data that each have a cyclic prefix.

At 206, a digital-to-analog conversion is performed on the pilot waveform signal. At 208, a radio frequency (RF) up-conversion is then performed to prepare the signal for transmission. The signal is then put through a 1:N splitter (1:3 splitter in the particular embodiment shown in FIG. 2), and one of the split signals is transmitted to one of the receivers 102-106.

At 210, RF down conversion is performed on the received signal, and analog-to-digital conversion is performed at 212 to prepare the signal for processing.

At 214, a processor at the receiver finds the Block Start sample offset, which comprises a course timing of the signal, and at 216, the cyclic prefix is processed.

A Fractionally Spaced-Frequency Domain Equalizer (FS-FDE) with half sample spacing may be derived at each receiver using Equations 1 and 2 below. The equalizer may be configured to operate on the fast Fourier transform (FFT) of the digitized samples, i.e., it may operate in the frequency domain. Prior to the FFT, since the equalizer is half spaced, the time-domain samples may be routed to a decimating de-interleaver at 218 that outputs two streams of time domain samples, each operating at half rate.

In some embodiments, the streams are called even sample and odd sample streams. That is, the decimating de-interleaver 218 may route the incoming time domain samples alternately to the even and odd sample paths 220-222. After this, fast Fourier transforms (FFTs) may be performed at 224-226.

Channel estimation may be performed on the pilot signal at 228 for the even and odd samples by:

Even FFT point Channel Estimate:

$$H_e(k) = \widehat{C_e}(k)/C(k) \quad (1a)$$

Odd FFT point Channel Estimate:

$$H_o(k) = \widehat{C_o}(k)/C(k) \quad (1b)$$

where C(k) is the k'th point FFT of the pilot signal. For example, C(k) may be derived from the known local copy of the calibration sequence. $\widehat{C_e}(k)$ is the k'th point FFT of the received calibrating signal's even samples, and $\widehat{C_o}(k)$ is the k'th point FFT of the received calibrating signal's odd samples. Note, since this is a half sample spacing equalizer, in equation (1a) (1b), C(k) is the FFT of the ideal pilot signal (i.e., the known local copy of the pilot signal) that has been decimated in the time domain by a factor of 2.

Even Equalizer Coefficients:

$$W_e(k) = \frac{H_e^*(k)}{|H_e(k)|^2 + |H_o(k)|^2 + \sigma_n^2} \quad (2a)$$

Odd equalizer coefficients:

$$W_o(k) = \frac{H_o^*(k)}{|H_e(k)|^2 + |H_o(k)|^2 + \sigma_n^2} \quad (2b)$$

where H(k) is the k'th sample FFT of the channel estimate from (1) and $\sigma_n^2$ is a noise power estimate.

Equalization is performed by:

$$\hat{X}(k) = W_e(k) \cdot Y_e(k) + W_o(k) \cdot Y_o(k) \quad (3)$$

where $\hat{X}(k)$ is the FFT of the k'th equalized sample, and $Y_e(k)$ and $Y_o(k)$ are the k'th FFT points of the even or odd time-domain digitized samples. Note that Equation (3) does not compensate for the amplitude attenuation or gain in the receive path.

Equations (1) and (2) may operate on the FFT result to derive the equalizer coefficients at 230. In the Operation Mode, equation (3) then performs equalization on the received RF signals.

The equalizer coefficients 230 remove the residual nanosecond timing offset between the various channels, flatten the frequency response in each channel, and also phase align the channels by removing the phase offset between each receive channel. The frequency response correction is a system level flatness correction that corrects for the combined frequency responses of the imperfect signal generator and the imperfect receivers. In some embodiments, the signal generator's frequency response may be pre-calibrated with an instrument grade vector signal analyzer (VSA). In these embodiments, the system level calibration would reduce to only the calibration of the imperfect receivers.

Frequency domain equalization and correlation typically require timing synchronization to determine the placement of the FFT window. This prior timing synchronization is based on either autocorrelation of the received signal or its cross-correlation with the original sequence. In the disclosed techniques, however, cross correlation of the received ZC/CAZAC sequence with a local copy of the sequence may begin at any point (without prior timing synchronization), e.g., because of the periodic nature of the transmitted signal, which may simplify signal processing architecture, reduce latency, and/or also allow determination of the TOA.

In some embodiments, after completion of the calibration process, the MIMO system may be configured to transition to an Operation Mode. After transitioning from the Cal Mode to Operation Mode, the N channel ADCs may be triggered to start acquisition together via the shared trigger. In Operation Mode, the switches 110 may connect the radios 102-106 to the antennas 112-116, to allow the radios to receive signals from the antennas.

A remote source may produce a data signal 232, add a cyclic prefix 234, perform digital-to-analog conversion on the signal 236, and perform RF up-conversion at 238 before transmitting the processed signal to one of the antennas 112-116. These steps may be performed analogously to steps 202-208 in the calibration mode, except that the pilot waveform signal now contains payload data rather than a reference sequence.

Once the signal is received by one of the radios 102-106, the radio again performs RF down-conversion on the signal 240, analog-to-digital conversion 242, calculates the Block Start coarse timing 244 using the Block Start sample offset found at 214, and processes the cyclic prefix 246, in a manner analogous to steps 210-216 in the Cal mode.

The time-domain samples may again be routed to a decimating de-interleaver at 248 that outputs two streams of time domain samples, each operating at half rate. That is, the decimating de-interleaver 248 may route the incoming time domain samples alternately to the even and odd sample paths 250-252. After this, fast Fourier transforms (FFTs) may be performed at 254-256.

Now in the digital domain, during Operation Mode, an FS-FDE digital signal processing (DSP) block is inserted at 258. This FS-FDE may use the same coefficients that were derived during the Cal Mode at 230. Finally, an inverse fast Fourier transform (IFFT) is performed on the processed signal at 260. At the output of the FS-FDE block, calibrated digital samples of the ADC acquired waveform may be produced that are time aligned down to picoseconds, phase aligned, and have the non-flat frequency response of the imperfect receiver removed. The cyclic prefix (CP) may be removed from the output.

Time Domain Equalizer

Figure 4:
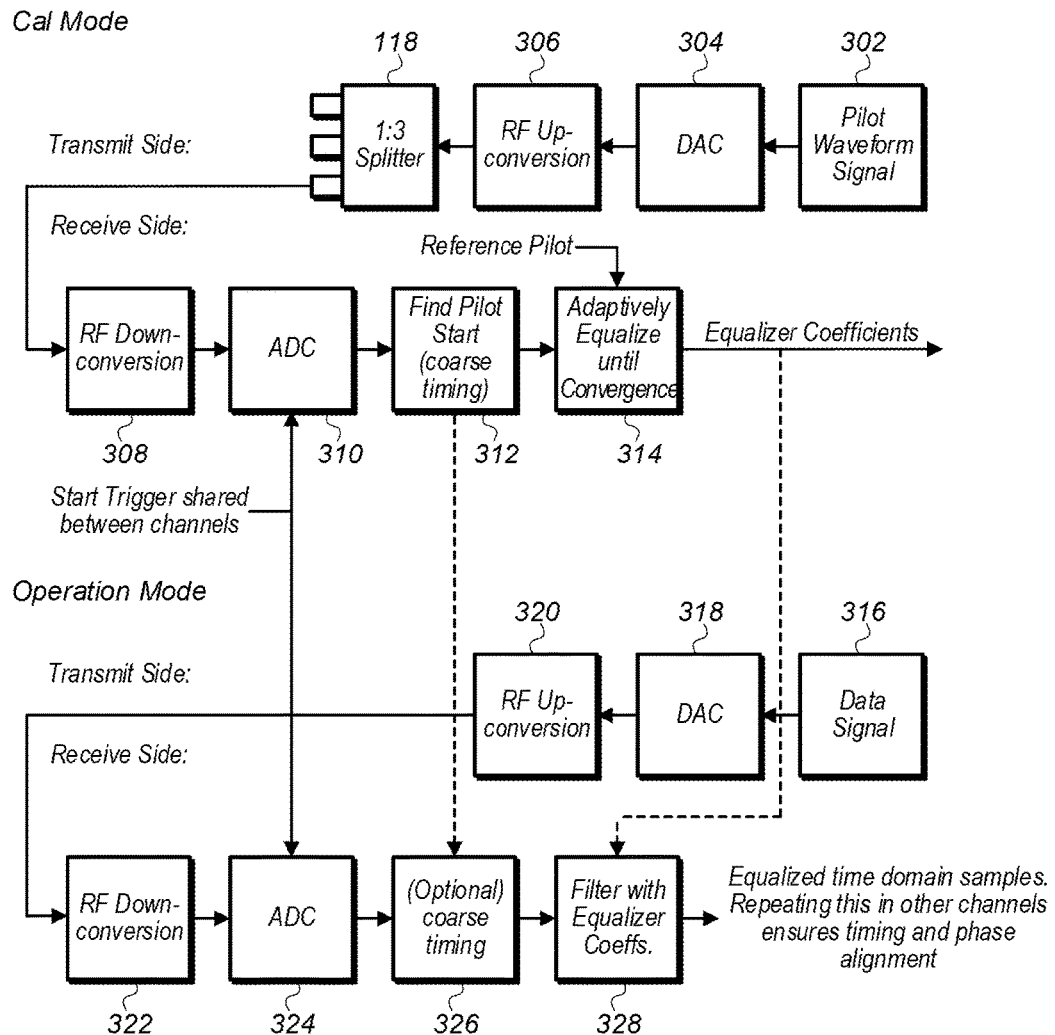
FIG. 4 is a flow diagram illustrating an exemplary method for performing calibration and subsequently operating using a time domain equalizer.

FIG. 4 illustrates an alternative embodiment wherein a time domain equalizer is used in place of an FS-FDE. FIG. 4 is illustrated for a single channel, but the steps illustrated in FIG. 4 may be repeated for each channel in the MIMO radio system.

The time-domain equalizer has the advantage that it does not need to operate on blocks of data and does not need a cyclic prefix. The coefficients of the time domain equalizer may be trained during the Cal Mode.

Cal mode for a time domain equalizer begins analogously to the case of a FS-FDE. At 302 a pilot waveform signal may be generated at the cal signal generator 120. The pilot waveform signal may be a ZC sequence, another CAZAC sequence, or some other reference sequence, according to various embodiments.

At 304, a digital-to-analog conversion is performed on the pilot waveform signal. At 306, a radio frequency (RF) up-conversion is then performed to prepare the signal for transmission. The signal is then put through a 1:N splitter (1:3 splitter in the particular embodiment shown in FIG. 3), and one of the split signals is transmitted to one of the receivers 102-106.

At 308, RF down conversion is performed on the received signal, and analog-to-digital conversion is performed at 310 to prepare the signal for processing.

At 312, a processor at the receiver finds the Pilot Start, which comprises a coarse timing of the signal, and at 314, a Reference Pilot (i.e., the known local copy of the calibration signal) is used to adaptively equalize until convergence is obtained, outputting equalizer coefficients.

In some embodiments, after completion of the calibration process, the MIMO system may be configured to transition to an Operation Mode. After transitioning from the Cal Mode to Operation Mode, the N channel ADCs may be triggered to start acquisition together via the shared trigger. In Operation Mode, the switches 110 may connect the radios 102-106 to the antennas 112-116, to allow the radios to receive signals from the antennas.

A remote source may produce a data signal 316, perform digital-to-analog conversion on the signal 318, and perform RF up-conversion at 320 before transmitting the processed signal to one of the antennas 112-116. These steps may be performed analogously to steps 302-306 in the calibration mode, except that the data signal now contains payload data rather than a reference sequence.

Once the signal is received by one of the radios 102-106, the radio again performs RF down-conversion on the signal 322, analog-to-digital conversion 324, and optionally calculates coarse timing 244 using the Pilot Start found at 312, in a manner analogous to steps 308-312 in the Cal mode. The coarse timing recover block may not be required in operation mode.

Finally, at 328, the signal may be filtered with the equalizer coefficients derived at 314. During operation mode, these equalizer coefficients may be used by a filter DSP block that operates after the ADC. At the output of the time domain equalizer, calibrated digital samples of the ADC acquired waveform may be produced that are time aligned down to picoseconds, phase aligned and have the non-flat frequency response of the imperfect receiver removed. Embodiments that utilize the time domain equalizer may be advantageous when the inter-symbol interference (ISI) caused by the non-flat frequency response of the imperfect receiver hardware is several data symbols long. Otherwise, the time-domain equalization filter may be very long and may need a long convergence time during calibration, which would make the frequency domain equalizer implementation more practical.

Shared Start Trigger

In some embodiments, an acquisition ADC start trigger may be shared between each receiver during Cal Mode and during Operation mode. The start acquisition trigger may preserve the timing alignment when moving from the Cal Mode to the Operation Mode. The N receivers may be time and phase aligned in the Cal Mode if the N ADCs all start the calibration process based on a shared trigger. Although the trigger is there to start the acquisition, there is likely to be several nanoseconds of residual timing misalignment between one ADC and another—hence the equalizer derived during Cal Mode may remove this timing mismatch and also phase align the receivers. After switching to the Operation Mode, the timing and phase alignment functions of the calibration equalizer previously derived may hold if all the N receivers' ADCs are initiated for acquisition together via the shared trigger.

Timing Recovery for Block Start

For FS-FDE during Operation Mode, the DSP unit that performs coarse timing recovery for block start may be simplified by using the "start sample offset" obtained during the Cal Mode for each of the N receivers. For the time domain equalizer method, the coarse timing block may be skipped altogether during Operation Mode, but it may be desirable in the Cal Mode to find the pilot start so that the equalizer training can start from that sample.

Real-Time Calibration Scheduling

In some embodiments, the data communication protocol used by the radios may be designed to automatically repeat the calibration step at pre-set intervals to improve MIMO performance. The radio protocol may be designed to have pre-scheduled gaps in data transmission such that the receivers can go from Operation to Cal Mode, perform calibration, and switch back to Operation Mode. In a packeted data transmission radio protocol using this invention, there may be time slots for calibration where data packets are not sent, but where real-time calibration of the phase, frequency and timing alignment is performed. As a result, the MIMO radio system may be configured to perform calibration in real-time without missing data packets from the antennas during the calibration procedures.

Implementations and Results

One embodiment of this invention has been implemented as part of National Instrument's (NI's) multi-receiver channel sounding system. As explained in further detail below, FIGS. 5-9 illustrate the results of this implementation. In this embodiment, the multi-receiver channel sounder consists of 2 or more (up to 4 in this particular embodiment) NI mm Wave receivers operating at 28 GHz. Trigger Clock (Tclk) is used in each channel for triggered multi-channel acquisition, but despite this, residual channel mis-alignment remains at the level of a few nanoseconds. This could be due to different cable lengths in the receive paths for each channel, as well as different ADC clocks that operate at 3.072 Giga-samples per second (Gsps) in the different receivers.

Figure 5:
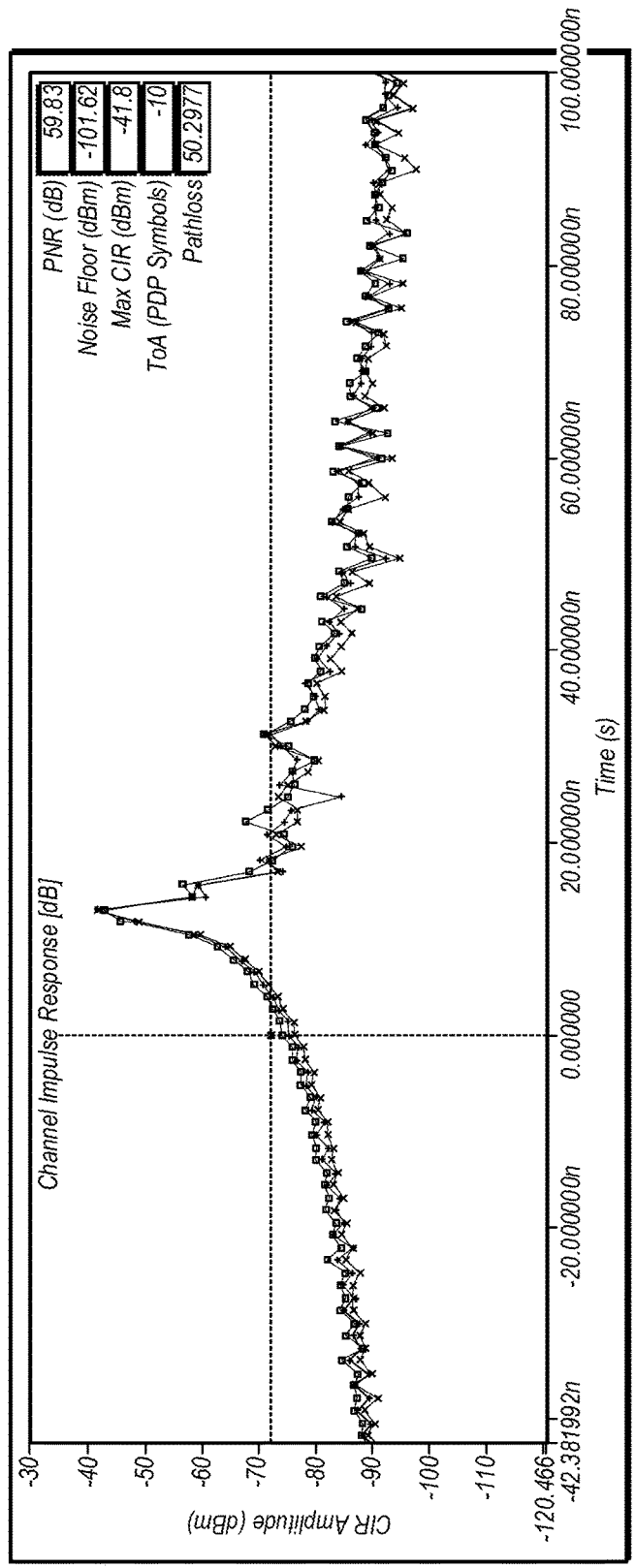
FIG. 5 is a real data plot of channel impulse response without calibration.
Figure 6:
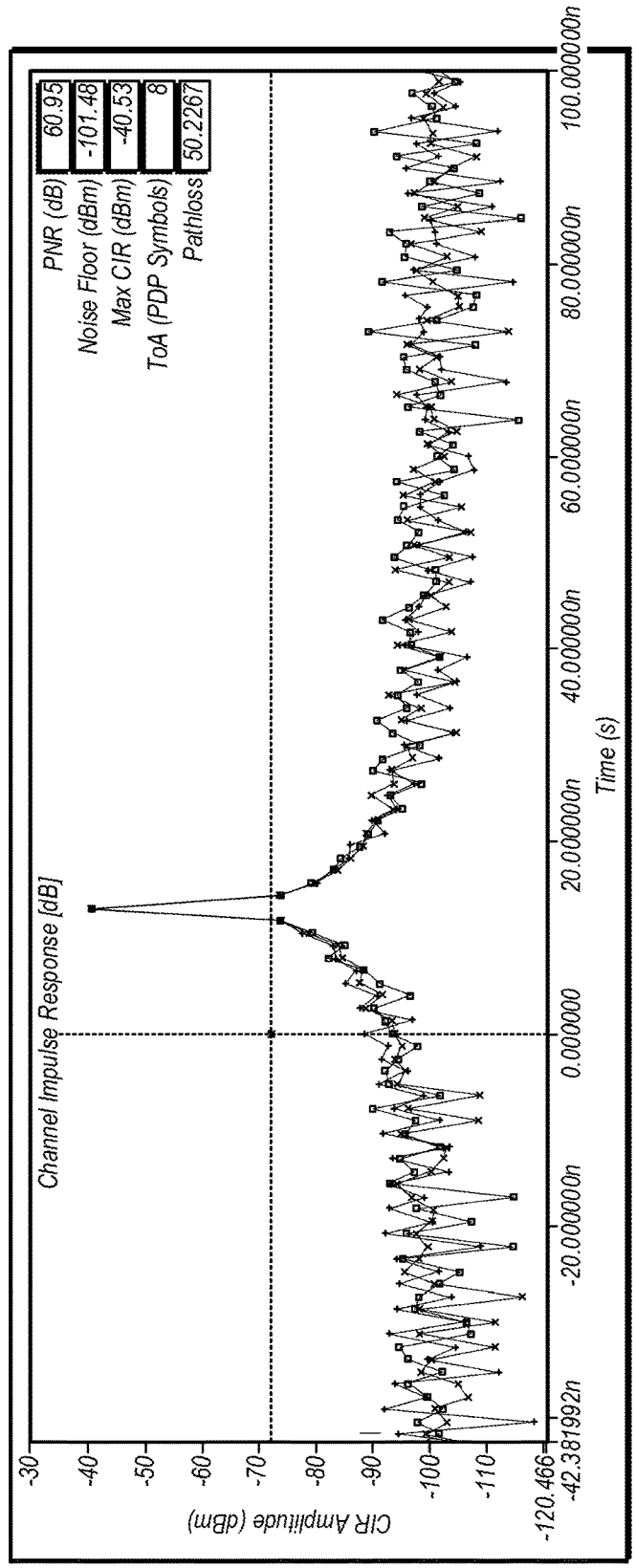
FIG. 6 is a real data plot of channel impulse response after calibration has been performed according to an implemented embodiment of the invention.
Figure 7:
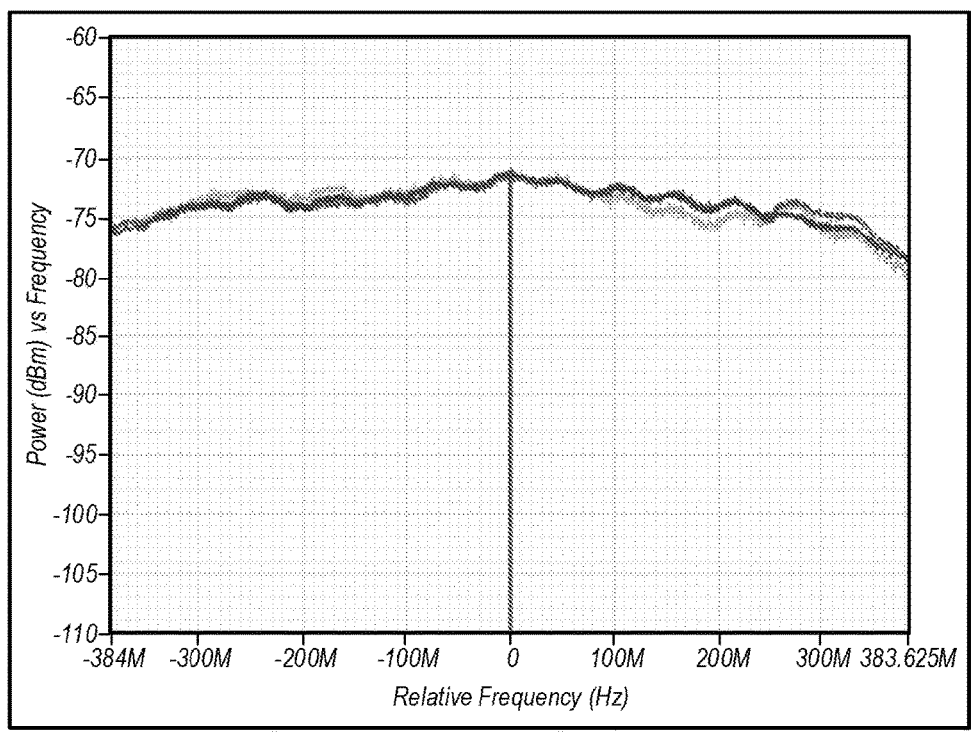
FIG. 7 is a real data plot of the channel frequency response without calibration.
Figure 8:
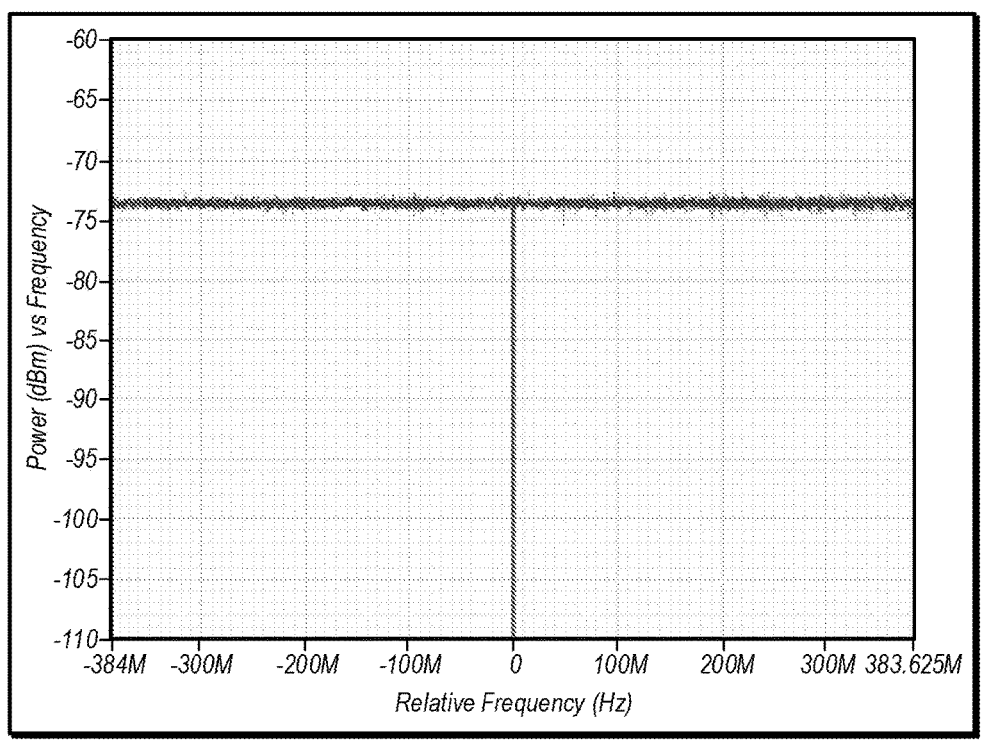
FIG. 8 is a real data plot of the channel frequency response after calibration has been performed according to an implemented embodiment of the invention.
Figure 9:
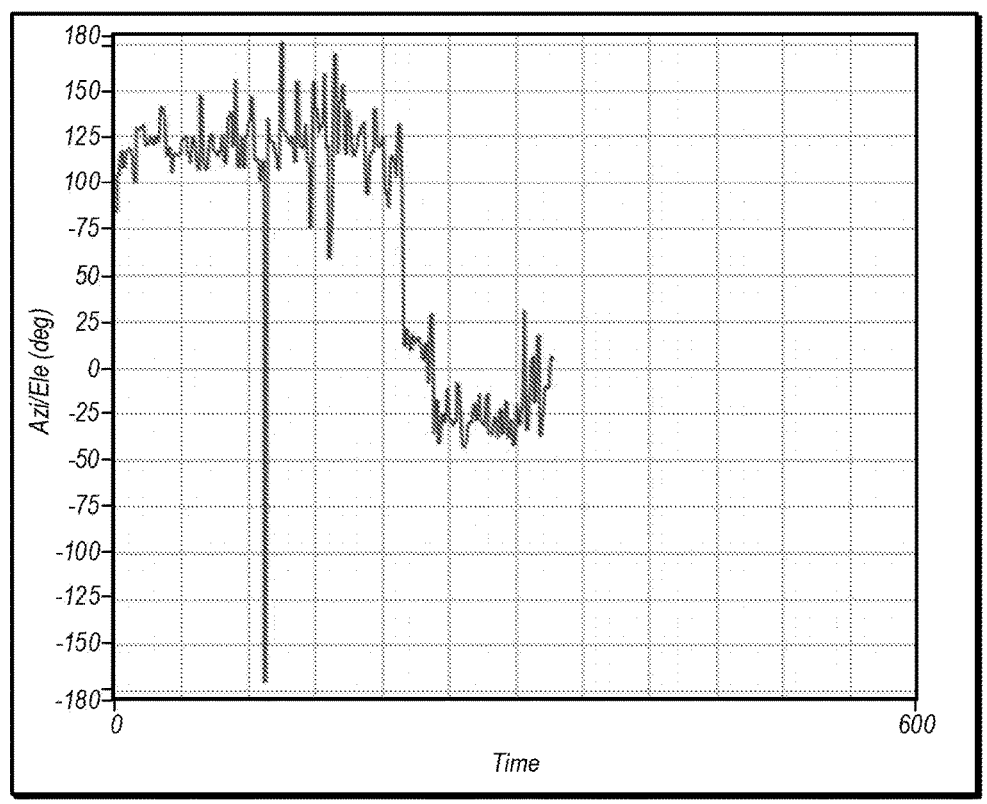
FIG. 9 is a real data plot of the maximum phase offset before and after calibration has been performed according to an implemented embodiment of the invention.

The hardware used to obtain the data of FIGS. 5-9 is setup in a similar configuration to FIG. 1. A wideband complex correlation signal is received simultaneously by the multiple receivers through the switches and a 1:4 splitter. Each receiver runs a correlator and the resulting correlation peaks or channel impulse responses have been plotted as a function of offset in FIGS. 4 and 5. Notice the multiple peaks in FIG. 5 (obtained without calibration), which exist because the frequency response is not flat. Additionally, the channel impulse responses look wide in FIG. 5 and don't perfectly overlap with each other. This is because there is a sub-sample timing misalignment between each receiver even after using the shared Tclk trigger, and this residual misalignment may be several hundreds of picoseconds. The frequency response is obtained by doing an FFT of the channel impulses, which exhibits ripples when calibration is not performed as shown in FIG. 7. In addition, there is a phase offset between the complex impulse responses in each channel, as shown in FIG. 9. When the calibration methods of this innovation disclosure are applied, the results in FIGS. 6, 8 and 9 may be obtained.

FIGS. 5 and 6—Channel Impulse Response without and with Calibration

FIGS. 5 and 6 show real data obtained for the channel impulse response, with and without using an embodiment of the calibration methods described herein FIG. 5 shows channel impulse response data (in dBm) for impulses obtained through correlation for 3 channels, without employing the calibration techniques described herein. There are multiple peaks above the horizontal dotted line caused by the different frequency responses in each receiver. The peaks in each of the 3 impulse response charts are a few samples wide and they do not perfectly overlap with each other. This is due to sub-sample misalignment even after using Trigger Clock (Tclk) and shared a start trigger.

FIG. 6 shows channel impulse response data (in dBm) for impulses obtained through correlation for 3 channels, after calibration has been performed according to one embodiment described herein. Note that all the plots align very closely at the peak, showing excellent correlation. Also, the correlation peak is narrow and one sample wide. This shows that the channels are now time aligned to within a few picoseconds. Additionally, there are no secondary channel impulse peaks as the frequency response has been equalized as shown below in FIG. 8.

FIGS. 7 and 8—Channel Frequency Response without and with Calibration

FIG. 7 shows the response (in dBm) of each channel as a function of frequency for each of the 3 channels, without calibration. It can be seen that the channel frequency response is not flat, and a different frequency response is obtained in each receiver path prior to calibration. Note that FIG. 7 is a fast Fourier transform of the data in FIG. 5.

FIG. 8 shows the response (in dBm) of each channel as a function of frequency for each of the 3 channels, after employing the calibration techniques of one embodiment of the present invention. It can be seen that the frequency response in every receiver has been calibrated to a flat identical frequency response. Note that FIG. 8 is a fast Fourier transform of the data in FIG. 6.

FIG. 9—Maximum Phase Offset Before and after Calibration

FIG. 9 shows the maximum phase difference between the 3 channels as a function of time. At time t=0, the channels are not calibrated, and then as indicated midway by the drop in phase difference, the calibration method is applied. This lowers the phase offset between the channels. However, since the LOs are not being shared by the three 28 GHz receivers, the phase offset does fluctuate even after calibration, although the maximum phase offset stays between +/−25 degrees.

FIGS. 6, 8, and 9 show the improvement in timing alignment, in frequency response, and in phase alignment, respectively, that is achieved through implementation of an embodiment of this innovation.

Figure 10:
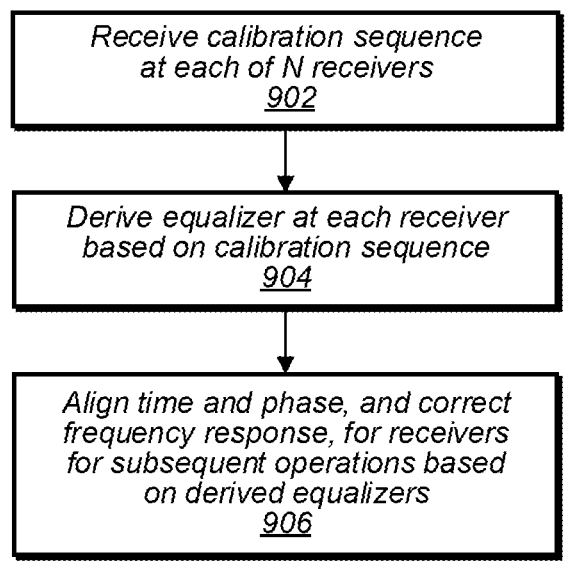
FIG. 10 is a flow chart diagram illustrating a calibration method, according to some embodiments.

FIG. 10—Method Flowchart for Calibration Process

FIG. 10 is a flowchart diagram showing an exemplary method by which a calibration process is performed on a MIMO radio device 100, according to some embodiments. At 902, a calibration sequence is received at each of N receivers. In some embodiments, the N receivers may be comprised within a MIMO communication system such as a MIMO radio device 100. The calibration sequence may be a Zadoff-Chu Sequence, another type of CAZAC sequence, or some other calibration sequence, in various embodiments. The calibration sequence may be received by a single source (e.g., by the calibration signal generator 120) using a splitter routed to each of the receivers.

At 904, the receivers each derive an equalizer based on the received calibration sequence. The equalizer may be a frequency domain equalizer, or a time domain equalizer, according to various embodiments. The frequency domain equalizer may be a fractionally-spaced frequency domain equalizer or another type of frequency domain equalizer, in various embodiments. Deriving the equalizer based on the received calibration sequence may involve performing a channel estimation calculation using the received calibration sequence and a known calibration sequence. The equalizers may be derived at least in part based on an inhomogeneity in a spectral decomposition of the received calibration sequence determined from the channel estimation calculation.

At 906, the MIMO communication system may align a time and a phase, and correct a frequency response, for at least one of the receivers based on the derived equalizers. The time alignment may correct for differences in transmission time of the calibration signal between the receivers. The phase alignment may correct for differences in accumulated phase of the calibration signal during transmission. through each of the different channels. Aligning the time and phase associated with at least one of the plurality of receivers based on the derived equalizers may involve aligning the time and phase based on a location of a peak in a cross-correlation calculation between the received calibration sequence and the known calibration sequence.

It may be appreciated that performing alignment to correct differences in transmission time and accumulated phase does not necessarily imply complete correction of differences. For example, the correction may simply reduce these differences (i.e., it may perform partial correction). A high frequency signal of, e.g., 28 GHz, has a wavelength of approximately 1 cm, so that even a small difference in transmission length (i.e., wire lengths connecting the N receivers that differ by 1 mm or less) can introduce significant differences in accumulated phase. Furthermore, hardware differences on the receiver side may result in differing frequency responses to calibration signal. The equalizers may be used to correct for a non-uniform frequency response in the receivers. Correcting the non-uniform frequency response based on the derived equalizers may involve correcting for an inhomogeneity in the spectral decomposition of the frequency response. The time and phase alignment and the frequency response correction may then be used for subsequent operations by the receivers when receiving transmitted data, in some embodiments.

Dual-Mode Calibration Process

In some embodiments, the methods described above may be expanded to perform calibration on each of a local and a remote transmitter. In particular, in some embodiments, the calibration may be performed by each of a "Receive Side Calibration Local Transmitter" (LT) that may be located locally to the MIMO system, and a "Remote Transmit Side Transmitter" (RT) that may be located remotely from the MIMO system.

In some embodiments, the calibration mode may comprise two phases. In some embodiments, a first mode, which may be called "Sparse Full System Cal" (SFSC), may be performed infrequently, e.g., once every few months, or at any other frequency. During Sparse Full System Cal, the receive side LT may be connected to the MIMO receivers, and equalizers may be derived based on the calibration methods disclosed above. These equalizers may phase and time align the multiple parallel n receivers and may provide a flat frequency response for the LT to Receiver$_i$ chain, where i goes from 1 to n receivers. The derived equalizers for the LT during SFSC may be called EQ_LT$_i$. In some embodiments, the LT may be always connected to the splitters by an RF cable for future use during Real-time Cal.

In some embodiments, SFSC may further comprise the transmit side RT being brought close to the MIMO system and being connected via RF cables to the MIMO receivers. In these embodiments, equalizers may be derived based on the calibration methods disclosed above. These equalizers may phase and time align the multiple parallel n receivers and provide a flat frequency response for the RT to Receiver$_i$ chain where i goes from 1 to n receivers. The derived equalizers for the RT during SFSC may be called EQ_RT$_i$.

In some embodiments, the ratio (EQ_RT$_i$/EQ_LT$_i$), which may be called a Cal Ratio, CR(k), may be calculated for each sample of the FDE at each frequency point k in the FDE. The equalizers EQ_RT$_i$ and EQ_LT$_i$ may be stored in a Cal file.

As will be explained in further detail below, the calibration file data may be used to derive equalizers for the RT during real-time calibration (RTC).

In some embodiments, a second mode, which may be called "Real-time Cal" (RTC), may be performed in real-time at pre-scheduled intervals during normal operation of the MIMO system, wherein the pre-scheduled intervals may be scheduled more frequently than Sparse Full System Cal.

During RTC, the receive side LT may be connected to the MIMO receivers and equalizers may be derived based on the methods disclosed above. These equalizers may phase and time align the multiple parallel n receivers and provide a flat frequency response for the LT to Receiver$_i$ chain. In these embodiments, the derived equalizers for the LT during Real-time Cal may be called EQ_LT_new$_i$.

In some embodiments, during RTC, the transmit side RT is far away and operating over the air. In these embodiments, there may be no way to physically connect (e.g., by cable) the remote RT to the MIMO receivers in order to phase and time align, and flatten the frequency response from the RT to Receiver$_i$ chain. In these embodiments, the EQ_RT$_i$ derived earlier may not phase and time align the receivers, as the phase and time alignment of the receivers may have changed from when SFSC was performed. However, the amplitude frequency response using EQ_RT$_i$ may mostly be flat since the analog RF components of the radio may not have changed since the last time SFSC was done (e.g., as long as no cabling changes were done to the receiver setup). In these embodiments, it may be desirable to derive a new equalizer that will preserve the flat amplitude frequency response correction of EQ_RT$_i$ but that will also phase and time align the receivers.

In one embodiment, this new equalizer is derived mathematically in the frequency domain as: EQ_RT_new$_i$=(EQ_RT$_i$/EQ_LT$_i$)×EQ_LT_new$_i$. The ratio (EQ_RT$_i$/EQ_LT$_i$) may be obtained from the cal file for each frequency point k. The new equalizer for RT may then incorporate real-time phase and time calibration derived for the local transmitter (EQ_LT_new$_i$), while also preserving the corrected amplitude frequency response obtained for the RT during the SFSC mode (EQ_RT$_i$). In other words, the techniques described herein may allow for real-time calibration of the RT without having to physically connect the remote RT to the MIMO system. With EQ_RT_new$_i$, the receivers may operate with time alignment and phase synchronization, and may flatten the amplitude frequency response in the RT to Receiver$_i$ chain during the over the air (OTA) remote operation of the RT.

In another embodiment, the new equalizer can be derived by using only the phase information of the complex value numbers calculated by (EQ_LT_new$_i$/EQ_LT$_i$). In this embodiment, the amplitude of the above complex number ratio is normalized to 1, but the phase information is used. As such, the new equalizer is derived in the frequency domain as EQ_RT_new$_i$=EQ_RT$_i$×Phase[(EQ_LT_new$_i$/EQ_LT$_i$)].

Figure 11:
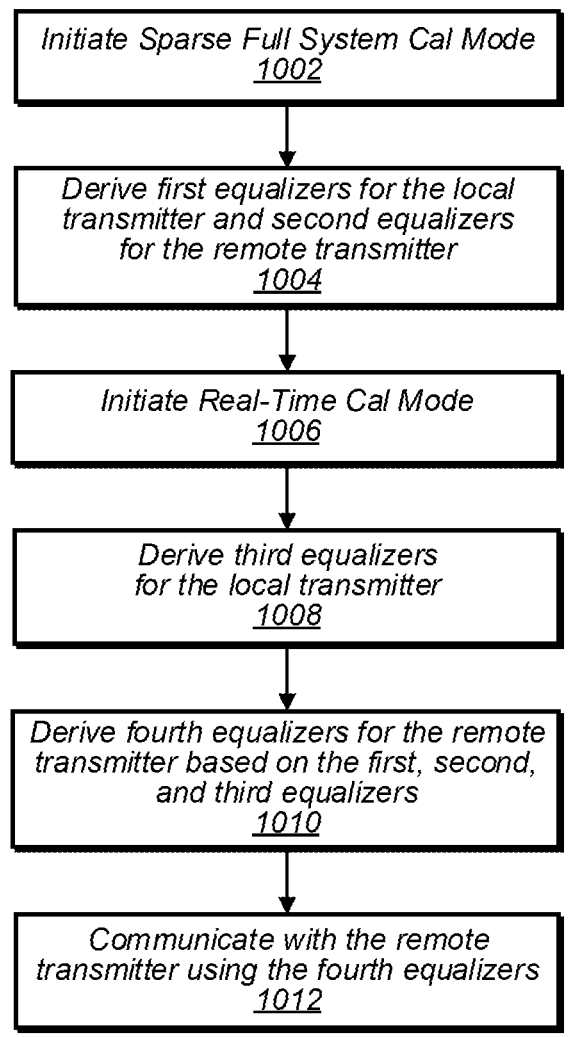
FIG. 11 is a flow chart diagram illustrating a dual-mode calibration method for calibrating a remote transmitter, according to some embodiments.

FIG. 11—Flowchart for Dual-Mode Calibration Process

FIG. 11 is a flowchart diagram showing an exemplary method by which a dual mode calibration process is performed, according to some embodiments. At 1002, a Spare Full System Cal (SFSC) mode is initiated. In some embodiments, during the SFSC, each of a remote transmitter and a local transmitter may be physically connected (e.g., by radio frequency cables or by other means) to a MIMO communication system.

In some embodiments, at 1004, first equalizers may be derived for the local transmitter, and second equalizers may be derived for the remote transmitter. The equalizers may each be derived based on a received calibration sequence. The equalizers may be derived based on a Zadoff-Chu Sequence, another type of CAZAC sequence, or any other type of calibration sequence. The equalizer may be a frequency domain equalizer, or a time domain equalizer, according to various embodiments. The frequency domain equalizer may be a fractionally-spaced frequency domain equalizer or another type of frequency domain equalizer, in various embodiments. If the equalizer is a frequency domain equalizer, a first and second equalizer may be derived for each of a plurality of frequencies.

In some embodiments, at 1006, the MIMO communication system may initiate a real-time calibration (RTC) mode. During the RTC mode, the remote transmitter may be located remotely from the MIMO communication system so that, for example, it may no longer be physically connected to the MIMO communication system.

In some embodiments, at 1008, third equalizers may be derived for the local transmitter. The third equalizers may be derived in a similar manner to the first equalizers in the SFSC mode, except that the third equalizer are based on current radio communication conditions.

In some embodiments, at 1010, fourth equalizers may be derived for the remote transmitter based on each of the first, second, and third equalizers. In some embodiments, the fourth equalizers may preserve amplitude frequency response correction information from the second equalizers. In some embodiments the fourth equalizers may further incorporate current radio communication conditions that are incorporated in the third equalizers. In some embodiments, the fourth equalizers may be configured to neglect equalizer information in the first and third equalizers that is specific to the local transmitter.

In some embodiments, at 1012, the MIMO system may be configured to communicate with the remote transmitter using the fourth equalizers. In some embodiments, the remote transmitter may be configured to communicate to with the MIMO system with an antenna, and the MIMO system may be configured to receive communications from the remote transmitter from a plurality of antennas. The MIMO system may be configured to calibrate the received communications using the fourth equalizers. For example, in some embodiments, the MIMO system may be configured to correct for time misalignment, phase misalignment, and a non-uniform frequency response of the received communications, in real time, using the fourth equalizers.

The embodiments described herein can be used in many synchronization applications, not necessarily limited to MIMO radios. For example, in test applications for newer cellular and WLAN standards that use MIMO, higher timing alignment in the testers would improve measurement performance. These embodiments work along with TClk to give picosecond timing alignment, as well as phase alignment. Hence, these embodiments may distinguish NI synchronization technology further for multi-channel alignment.

Embodiments described herein may solve a critical technical problem using channel sounders. In the field of channel sounding, these techniques permit Angle of Arrival algorithms to work for future channel sounding operations.

Some embodiments may be advantageous in radio direction finding applications, since phase and time aligning multiple receivers is critical to running direction finding algorithms in these applications.

Embodiments of the present disclosure may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a computing device may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The invention claimed is:

1. A method for calibrating a remote transmitter (RT) to a plurality of receivers in a multiple input multiple output (MIMO) communication system, the method comprising:
    operating in a first calibration mode, wherein operating in the first calibration mode comprises:
        deriving first equalizers for a local transmitter (LT), wherein the first equalizers align a time and a phase, and correct a non-uniform frequency response, associated with communication between the LT and the plurality of receivers; and
        deriving second equalizers for the RT, wherein the second equalizers align a time and a phase, and correct a non-uniform frequency response, associated with communication between the RT and the plurality of receivers; and
    operating in a second calibration mode, wherein the RT is located remotely from the MIMO system while operating in the second calibration mode, wherein operating in the second calibration mode comprises:
        deriving third equalizers for the LT, wherein the third equalizers align a time and a phase, and correct a non-uniform frequency response, associated with communication between the LT and the plurality of receivers; and
        deriving fourth equalizers that are based on each of the first, second, and third equalizers, wherein the fourth equalizers are usable to calibrate communications received by the MIMO system from the remotely located RT.

2. The method of claim 1, the method further comprising:
    subsequent to operating in the first and second calibration modes:
        using a switch at each of the plurality of receivers to switch to an operation mode;
        wherein, while in the operation mode, each receiver of the plurality of receivers is configured to receive signals from the RT and calibrate the signals received from the RT in real time using the fourth equalizers.

3. The method of claim 2, wherein the method is configured to be performed in real time by:
    automatically repeating the second calibration mode at preset intervals;
    alternating between the second calibration mode and the operation mode according to the preset intervals;
    wherein the RT is designed to have pre-scheduled gaps in data transmission such that the pre-scheduled gaps coincide with the repeating of the calibration mode.

4. The method of claim 3, wherein operating in operation mode comprises using third equalizers from a most recent second calibration mode.

5. The method of claim 1, wherein the derived equalizers are fractionally-spaced frequency-domain equalizers.

6. The method of claim 5, wherein a first, second, third and fourth equalizer is derived for each of a plurality of frequencies.

7. The method of claim 6, wherein the fourth equalizer for each frequency is equal to the second equalizer for that frequency, multiplied by the third equalizer for that frequency, divided by the first equalizer for that frequency.

8. The method of claim 6, wherein the fourth equalizer for each frequency is equal to the second equalizer for that frequency, multiplied by a phase of the third equalizer for that frequency, divided by a phase of the first equalizer for that frequency.

9. The method of claim 1, wherein calibrating communications received by the MIMO system from the remotely located RT comprises aligning a time and a phase, and correcting a non-uniform frequency response between the remotely located RT and the plurality of receivers.

10. A multiple-input multiple-output (MIMO) radio device comprising a plurality of receivers coupled to one or more processing elements, wherein the plurality of receivers and the one or more processing elements are configured to:
    operate in a first calibration mode, wherein, in operating in the first calibration mode, the plurality of receivers and the one or more processing elements are configured to:
        derive first equalizers for a local transmitter (LT), wherein the first equalizers align a time and a phase, and correct a non-uniform frequency response, associated with communication between the LT and the plurality of receivers; and derive second equalizers for a remote transmitter (RT), wherein the second equalizers align a time and a phase, and correct a non-uniform frequency response, associated with communication between the RT and the plurality of receivers; and operate in a second calibration mode, wherein the RT is located remotely from the MIMO system while operating in the second calibration mode, wherein, in operating in the second calibration mode, the plurality of receivers and the one or more processing elements are configured to:

derive third equalizers for the LT, wherein the third equalizers align a time and a phase, and correct a non-uniform frequency response, associated with communication between the LT and the plurality of receivers; and derive fourth equalizers that are based on each of the first, second, and third equalizers, wherein the fourth equalizers are usable to calibrate communications received by the MIMO system from the remotely located RT.

11. The MIMO radio device of claim 10, wherein the plurality of receivers and the one or more processing elements are further configured to:

subsequent to operating in the first and second calibration modes:

use a switch at each of the plurality of receivers to switch to an operation mode;

wherein, while in the operation mode, each receiver of the plurality of receivers is configured to receive signals from the RT and calibrate the signals received from the RT in real time using the fourth equalizers.

12. The MIMO radio device of claim 11, wherein operation mode further comprises, by each of the receivers, using a shared start trigger to initiate reception of the respective signal from the respective antenna.

13. The MIMO radio device of claim 11, wherein the MIMO radio device is configured to perform in real time by:

automatically repeating the second calibration mode at preset intervals;

alternating between the second calibration mode and the operation mode according to the preset intervals;

wherein the RT is designed to have pre-scheduled gaps in data transmission such that the pre-scheduled gaps coincide with the repeating of the calibration mode.

14. The MIMO radio device of claim 10, the method further comprising, by each of the receivers:

using a shared start trigger to initiate reception of the calibration sequence.

15. The MIMO radio device of claim 10, wherein the plurality of receivers share a single local oscillator, wherein sharing the single local oscillator enables the MIMO communication system to remain calibrated for an extended duration of time.

16. A non-transitory computer-readable memory medium comprising program instructions executable by a processor to calibrate a plurality of receivers in a multiple-input multiple-output (MIMO) communication system, wherein the program instructions are executable to:

operate in a first calibration mode, wherein, in operating in the first calibration mode, the plurality of receivers and the one or more processing elements are configured to:

derive first equalizers for a local transmitter (LT), wherein the first equalizers align a time and a phase, and correct a non-uniform frequency response, associated with communication between the LT and the plurality of receivers; and derive second equalizers for a remote transmitter (RT), wherein the second equalizers align a time and a phase, and correct a non-uniform frequency response, associated with communication between the RT and the plurality of receivers; and operate in a second calibration mode, wherein the RT is located remotely from the MIMO communication system while operating in the second calibration mode, wherein, in operating in the second calibration mode, the plurality of receivers and the one or more processing elements are configured to:

derive third equalizers for the LT, wherein the third equalizers align a time and a phase, and correct a non-uniform frequency response, associated with communication between the LT and the plurality of receivers; and derive fourth equalizers that are based on each of the first, second, and third equalizers, wherein the fourth equalizers are usable to calibrate communications received by the MIMO communication system from the remotely located RT.

17. The non-transitory computer-readable memory medium of claim 16, wherein the program instructions are further executable to:

subsequent to operating in the first and second calibration modes:

use a switch at each of the plurality of receivers to switch to an operation mode;

wherein, while in the operation mode, each receiver of the plurality of receivers is configured to receive signals from the RT and calibrate the signals received from the RT in real time using the fourth equalizers.

18. The non-transitory computer-readable memory medium of claim 17, wherein the program instructions are further executable to perform calibration in real time by:

automatically repeating the second calibration mode at preset intervals;

alternating between the second calibration mode and the operation mode according to the preset intervals;

wherein the RT is designed to have pre-scheduled gaps in data transmission such that the pre-scheduled gaps coincide with the repeating of the calibration mode.

19. The non-transitory computer-readable memory medium of claim 16, wherein the derived equalizers are time domain equalizers.

20. The non-transitory computer-readable memory medium of claim 16, wherein the first, second and third equalizers are derived using a Constant Amplitude Zero Autocorrelation (CAZAC) sequence.

* * * * *